United States Patent
Gonzalez Uribe et al.

(10) Patent No.: US 10,391,902 B2
(45) Date of Patent: Aug. 27, 2019

(54) VEHICLE SEAT

(71) Applicant: Toyota Jidosha Kabushiki Kaisha, Toyota-shi, Aichi (JP)

(72) Inventors: Carlos David Gonzalez Uribe, Susono (JP); Kohshi Katoh, Hadano (JP); Hikaru Sato, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 198 days.

(21) Appl. No.: 15/460,209

(22) Filed: Mar. 15, 2017

(65) Prior Publication Data

US 2017/0267145 A1 Sep. 21, 2017

(30) Foreign Application Priority Data

Mar. 16, 2016 (JP) .................. 2016-052313

(51) Int. Cl.
| | | |
|---|---|---|
| *A47C 7/02* | (2006.01) | |
| *B60N 2/68* | (2006.01) | |
| *B60N 2/64* | (2006.01) | |
| *B60N 2/70* | (2006.01) | |

(52) U.S. Cl.
CPC .............. *B60N 2/68* (2013.01); *B60N 2/643* (2013.01); *B60N 2/686* (2013.01); *B60N 2/7011* (2013.01)

(58) Field of Classification Search
CPC ...... B60N 2/643; B60N 2/7011; B60N 2/686; B60N 2/68; B60N 2002/684; B60N 2/682; B60N 2/72; B60N 2/70; A47C 7/32; A47C 7/22; A47C 7/425; B64D 11/06; B64D 11/0649; B64D 11/0691

USPC ... 297/284.4, 284.1, 452.18, 452.13, 452.52, 297/452.5, 452.44, 452.45, 452.53
See application file for complete search history.

(56) References Cited

U.S. PATENT DOCUMENTS

| | | | | |
|---|---|---|---|---|
| 6,231,125 B1* | 5/2001 | Maeda | .................. | A47C 7/282 297/452.56 |
| 6,375,269 B1* | 4/2002 | Maeda | .................. | A47C 7/282 297/218.2 |
| 6,378,949 B1 | 4/2002 | Maeda et al. | | |
| 6,843,530 B1* | 1/2005 | Wu | .......................... | A47C 7/38 297/284.3 |
| 7,475,943 B1* | 1/2009 | Huang | .................. | A47C 7/405 297/284.4 |
| 8,297,708 B2* | 10/2012 | Mizobata | ............. | B60N 2/7011 297/230.11 |
| 9,090,188 B2* | 7/2015 | Imamura | .................. | B60N 2/64 |

(Continued)

FOREIGN PATENT DOCUMENTS

| | | |
|---|---|---|
| JP | 2000-316664 A | 11/2000 |
| JP | 5655948 B2 | 1/2015 |

(Continued)

*Primary Examiner* — Chi Q Nguyen
(74) *Attorney, Agent, or Firm* — Hauptman Ham, LLP (57) ABSTRACT

A seatback of a vehicle seat includes a seatback frame and a backrest attached to the seatback frame. The backrest includes a first supporting area configured to receive a load of a shoulder of the occupant, and a second supporting area configured to receive a load of a spine area of the occupant. Support stiffness in the first supporting area for a vertical load is lower than that in the second supporting area. Support stiffness in the second supporting area for a shearing load is higher than that in the first supporting area.

20 Claims, 8 Drawing Sheets (56) References Cited

U.S. PATENT DOCUMENTS

| | | | |
|---|---|---|---|
| 9,873,364 B2* | 1/2018 | Hamabe | B60N 2/7094 |
| 2002/0041121 A1* | 4/2002 | Takata | B60N 2/3011 |
| | | | 297/378.1 |
| 2002/0135218 A1* | 9/2002 | Fujita | B60N 2/5891 |
| | | | 297/452.56 |
| 2005/0275273 A1 | 12/2005 | Nakamura | |
| 2011/0298268 A1* | 12/2011 | Mizobata | B60N 2/682 |
| | | | 297/452.18 |
| 2012/0267939 A1* | 10/2012 | Ota | B60N 2/7011 |
| | | | 297/452.56 |
| 2014/0028074 A1* | 1/2014 | Imamura | B60N 2/64 |
| | | | 297/452.18 |
| 2014/0191550 A1 | 7/2014 | Katoh et al. | |
| 2015/0108820 A1* | 4/2015 | Fujita | B60N 2/7011 |
| | | | 297/452.48 |
| 2015/0239381 A1 | 8/2015 | Hamabe et al. | |
| 2015/0367756 A1 | 12/2015 | Katoh et al. | |
| 2016/0009199 A1 | 1/2016 | Hamabe et al. | |
| 2016/0159254 A1 | 6/2016 | Katoh et al. | |

FOREIGN PATENT DOCUMENTS

| | | |
|---|---|---|
| JP | 2015-160457 A | 9/2015 |
| JP | 2016-5938 A | 1/2016 |
| JP | 2016016754 A | 2/2016 |
| WO | 2015/011803 A1 | 1/2015 |

* cited by examiner

VEHICLE SEAT

CROSS REFERENCE TO RELATED APPLICATIONS

The present application claims the benefit of priority to Japanese Patent Application No. 2016-052313 filed on Mar. 16, 2016 with the Japanese Patent Office, the entire contents of which are incorporated herein by reference in its entirety.

BACKGROUND

Field of the Disclosure

Embodiments of the present application relate to a vehicle seat.

Discussion of the Related Art

Vehicle seats are required to hold an occupant stably in natural posture. However, a driver moves his/her body when turning a steering wheel, when moving a shift lever etc., and a passenger is swayed by a lateral load during turning. US 2015/0239381 A1 describes an example of a vehicle seat comfortably holding an occupant. The vehicle seat taught by US 2015/0239381 A1 comprises a net attached to a seat backrest frame a connection portion located higher than a vertical center of the seat backrest frame, and string portions arranged radially between the seatback frame and the connection portion. Rigidity of the string portion is high in the axial direction but low in the bending direction so that the occupant sitting on the vehicle seat is allowed to twist his/her upper body around the connection portion. According to the teachings of US 2015/0239381 A1, therefore, the posture maintaining capability of the vehicle seat during turning is improved.

US 2014/0191550 A1 describes a vehicle seat apparatus having a seat unit supporting mechanism rotatably supporting a seat unit about a rotation axis longitudinally passing though near a waist of a driver. According to the teachings of US 2014/0191550 A1, the rotation axis of the seat unit using the seat unit supporting unit is set so that a rear side is higher than a front side in the longitudinal direction of the vehicle seat apparatus. In the vehicle seat apparatus taught by US 2014/0191550 A1, the seat unit is rotated with a rotation of a seat backrest so that a distance between one side of the seat unit and the seat backrest is changed. When the driver turns a steering wheel, one of hands is moved upwardly while pulling one of shoulders frontward, and the other hand is moved downwardly while withdrawing the other shoulder backwardly. In this situation, the seat backrest of US 2014/0191550 A1 is turned with a twisting motion of an upper body of the driver.

PCT international publication WO 2015/011803 and US 2015/0367756 A1 also describe vehicle seats. According to the teachings of US2015/0367756 A1, a net of radial pattern or a spider web pattern made of threads is attached to a sub-frame. The sub-frame is suspended from a main frame through a swivel-coupling section while being allowed to swivel.

SUMMARY

In some embodiment, a vehicle seat comprises a seatback including a seatback frame and a backrest attached to the seatback frame for supporting a back of an occupant sitting on the vehicle seat. The backrest includes a first supporting area configured to receive a load of a shoulder of the occupant including a shoulder blade, and a second supporting area configured to receive a load of a spine area of the occupant between the shoulders. In addition, support stiffness in the first supporting area for a load perpendicular to the backrest is lower than that in the second supporting area, and support stiffness in the second supporting area for a load in a shearing direction is higher than that in the first supporting area.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION

Figure 1:
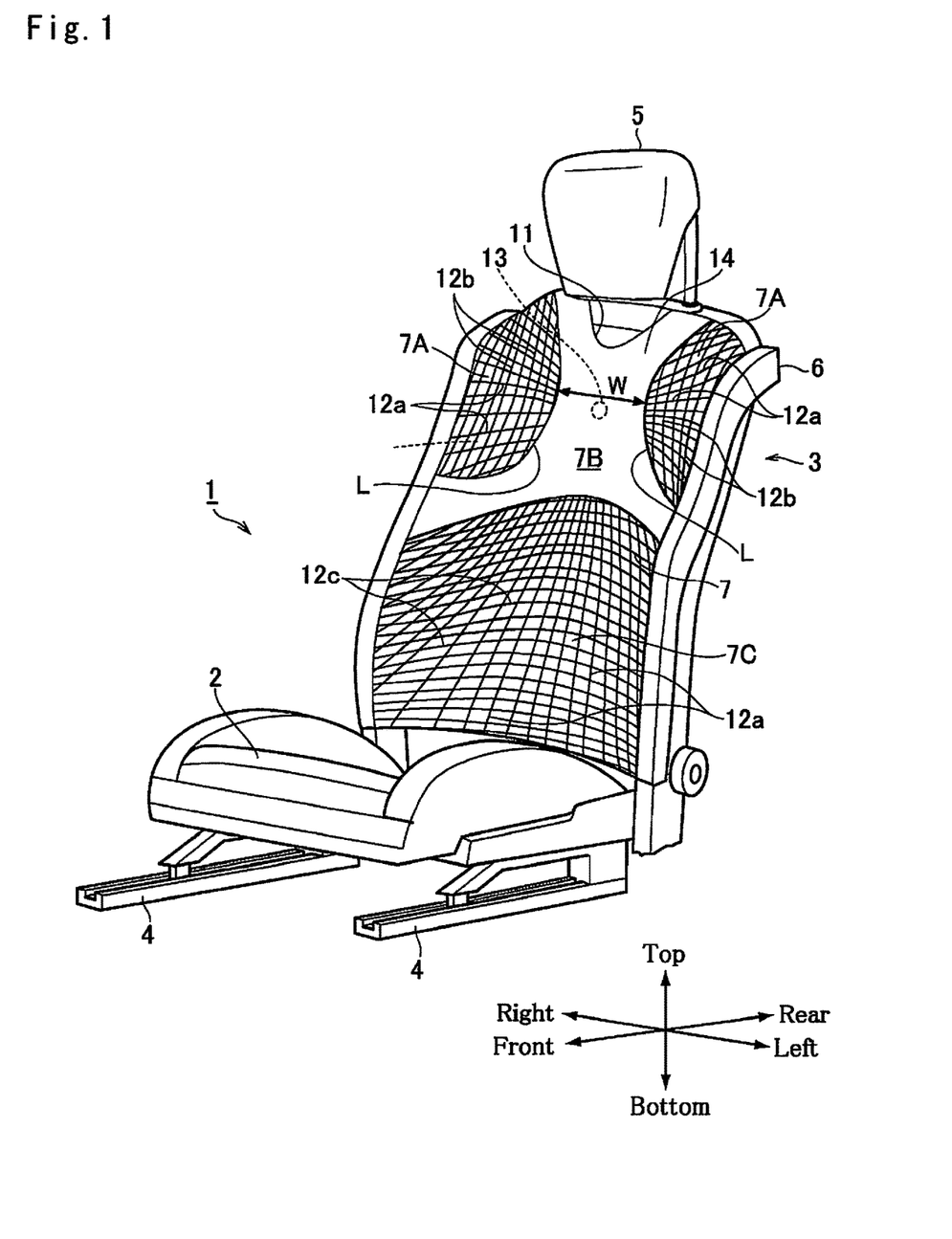
FIG. 1 is a perspective view showing the vehicle seat according to at least one embodiment of the present application.

Preferred embodiments of the present application will now be explained with reference to the accompanying drawings. Turning now to FIG. 1, there is shown a vehicle seat 1 according to at least one embodiment of the present application. As illustrated in FIG. 1, the vehicle seat 1 is contoured to hold one person, and is used, in some embodiments, not only as a driver's seat but also as a passenger seat, e.g., a front passenger seat. The vehicle seat 1 comprises a seat base 2 on which an occupant sits, and a seatback 3 for supporting the occupant's back. The vehicle seat 1 is mounted on a rail 4 so that a longitudinal position of the vehicle seat 1 is adjustable in a vehicle, and the seatback 3 is reclinable to adjust an inclination. A headrest 5 is attached to an upper portion of the seatback 3 to support a head of the occupant.

Figure 2:
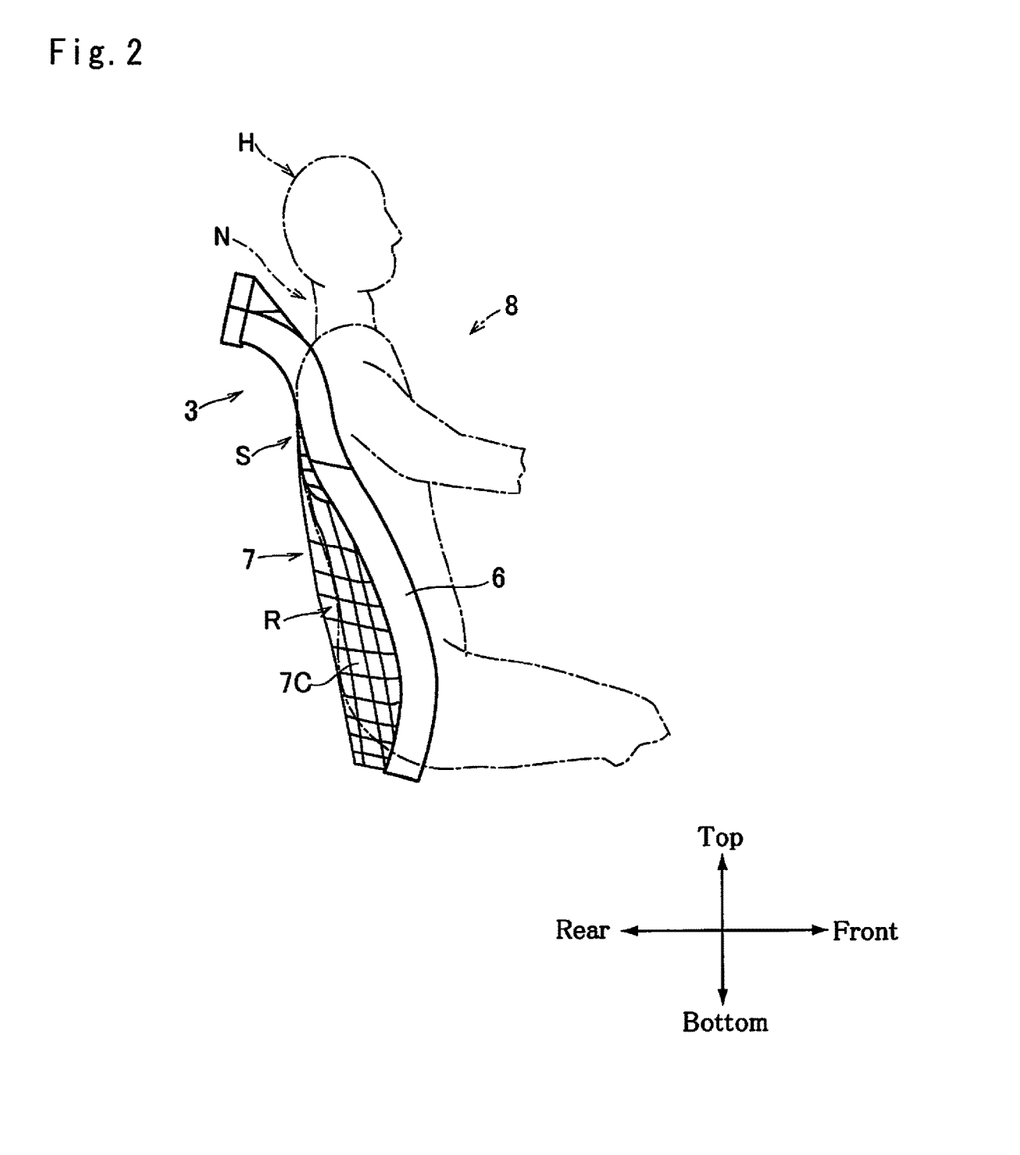
FIG. 2 is a schematic illustration showing an occupant settling his/her back against a seat backrest according to at least one embodiment.

As a bucket seat or a semi-bucket seat in some embodiments, the vehicle seat 1 is contoured in such a manner as to hold especially an upper body of the occupant tightly while allowing the occupant to move flexibly when, e.g., subjected to lateral acceleration during turning. Specifically, the seatback 3 for supporting a back of the occupant comprises a seatback frame (as will be simply called the "frame" hereinafter) 6 erected from a rear end portion of the seat base 2 while being inclinable, and a backrest 7 attached to an inner face of the frame 6 to support the back of the occupant from the lumbar spine to the shoulder blades. To this end, as depicted in FIG. 2, the frame 6 and the backrest 7 are contoured along the back of the occupant 8. Specifically, the frame 6 is contoured in such a manner that portions supporting shoulder S and hip of the occupant 8 are slightly withdrawn backwardly, but a portion supporting lumber spine R of the occupant is protruded to the front.

Figure 3:
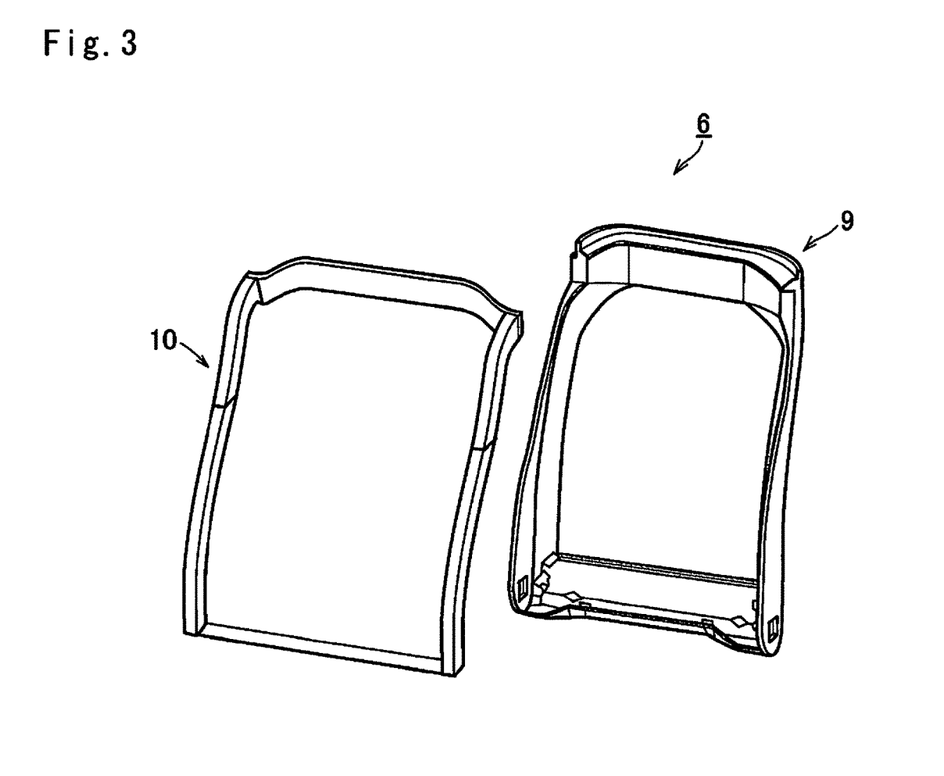
FIG. 3 is a perspective view showing a main frame and a sub-frame according to at least one embodiment.

As illustrated in FIG. 3, the frame 6 includes a mainframe 9 connected to the seat base 2 and a sub-frame 10 to which the backrest 7 is attached. In some embodiments, the backrest 7 is attached to the sub-frame 10, and the sub-frame 10 to which the backrest 7 has already been attached is attached to the mainframe 9. Alternatively, in some embodiments, the frame 6 is formed monolithically.

When the occupant 8 sitting on the vehicle seat 1 moves his/her arm or upper body, some part of his/her body counteracts to maintain a current posture. For example, when the right arm of human being walking ahead is swung to the front, the left arm is swung backwardly to maintain an orientation of his/her body. Such counteraction of the human body is also caused in the vehicle seat when moving the arm or twisting the upper body. In this situation, an intermediate part of the human body between the moving part and the counteracting part will not be moved significantly. In order to allow the upper body of the occupant to move smoothly, each part of the backrest 7 has different structures.

When the head H of the occupant 8 is shaken, the neck N may suffer from fatigue and the occupant 8 may feel sick as a result of frequent eyeball movements. In order to prevent or minimize these inconveniences, the upper body of the occupant 8 is allowed, in some embodiments, to move smoothly thereby stabilizing movement of the head H. To this end, the backrest 7 of the vehicle seat 1 is adapted to allow the shoulder blades to move smoothly while restricting movement of the spine situated between the shoulders. Specifically, each shoulder S of the occupant 8 is individually held within, and/or supported by, a first supporting area 7A, the spine of the occupant 8 is held within, and/or supported by, a second supporting area 7B, and the lumber spine R of the occupant 8 is held within, and/or supported by, a third supporting area 7C. In the vehicle seat 1, support stiffness (i.e., vertical stiffness) of each of the supporting area 7A to 7C for a load perpendicular to the backrest 7 (i.e., for a load in the longitudinal direction of the vehicle) are individually differentiated, and support stiffness of each of the supporting areas 7A to 7C for a shearing load applied to the backrest 7 in a shearing direction (i.e., shear stiffness) are individually differentiated. Specifically, the vertical stiffness of each of the supporting areas 7A to 7C against deformation caused by the perpendicular load is individually differentiated by varying material and/or structure thereof. On the other hand, the shear stiffness of the backrest 7 against deformation caused by the shearing load is governed not only by the material and structure thereof but also by friction coefficient. Therefore, the shear stiffness of each of the supporting areas 7A to 7C is individually differentiated by varying the material, structure and friction coefficient thereof, thereby realizing different mobility of the back of the occupant 8 in the lateral direction and the turning direction.

As illustrated in FIG. 1, each of the first supporting area 7A is enclosed by a contour L (i.e., a boundary between the first supporting area 7A and the second supporting area 7B) along an outline of the shoulder blade and the frame 6 to support the shoulder S of the occupant 8, and the vertical stiffness and the shear stiffness in the first supporting area 7A is adjusted in such a manner as to allow the shoulder S of the occupant 8 to move smoothly in both longitudinal and lateral directions. Specifically, a pair of the first supporting areas 7A is expanded in the upper area of the backrest 7 except for a width W for supporting the spine of the occupant 8, and each of the contours L is curved along a side edge of trapezius muscle toward a width center of the backrest 7 to hold the shoulder blade.

The second supporting area 7B expands from a level slightly lower than lower ends of the first supporting areas 7A to an upper end of the backrest 7 between the first supporting areas 7A. The upper end portion of the second supporting area 7B splits into two to create a U-shaped or V-shaped vacant area 11 to ensure free movement of the neck N of the occupant 8 within the vacant area 11. In order to support the upper body of the occupant 8 most steadily in the second supporting area 7B, at least the vertical stiffness and the shear stiffness in the second supporting area 7B are enhanced to be higher than those in the first supporting area 7A. To this end, both lower ends and upper ends of the second supporting area 7B are connected to the frame 6. That is, each of the first supporting area 7A is enclosed by the second supporting area 7B and the frame 6.

The third supporting area 7C expands between the second supporting area 7B and a lower end of the backrest 7 to support the lumber spine R of the occupant 8. For example, when the occupant 8 is subjected to lateral load during turning, the occupant 8 twists or swings laterally his/her lumber spine R to stabilize his/her neck N and head H. In order to ensure smooth movement of the lumber spine R, the shear stiffness in the third supporting area 7C is reduced to be lower than that in the second supporting area 7B. In addition, the vertical stiffness in the third supporting area 7C is enhanced to be higher than that in the first supporting area 7A to hold the lumber spine R tightly thereby maintaining appropriate posture of the occupant.

According to at least one embodiment, a net member is used to form the first supporting area 7A and the third supporting area 7C. The net member comprises a plurality of first strings 12a drawn radially between a hub member 13 disposed on a portion of a back face of the second supporting area 7B corresponding to the spine of the occupant 8 and the frame 6, and a plurality of second strings (e.g., warp threads) 12b intersecting the first strings 12a. For example, the second strings 12b are drawn vertically to connect the first strings 12a. Leading ends of the first strings 12a are attached to the frame 6 to establish a desired tension in the first supporting area 7A, and both leading ends of the second strings 12b are attached to the frame 6 according to some embodiments. In the first supporting area 7A, the first strings 12a and the second strings 12b are stretched by the perpendicular load applied to the first supporting area 7A from the occupant's back, and a tension in the first supporting area 7A thus formed of the first strings 12a and the second strings 12b acts as a resistance against the perpendicular load. According to at least one embodiment, the first strings 12a and the second strings 12b are individually made of material having an initial tensile strength possible to achieve desired vertical stiffness in the first supporting area 7A.

When the shearing load is applied to the first supporting area 7A in the direction along the surface of the backrest 7, the first strings 12a and the second strings 12b are subjected to bending load. If magnitude of such bending load is relatively weak and hence the first supporting area 7A is slightly displaced, the first strings 12a and the second strings 12b establish only a small resistance. By contrast, if magnitude of such bending load is relatively strong thereby stretching the first strings 12a and the second strings 12b, the resistance established by the first strings 12a and the second strings 12b is increased. In the first supporting area 7A, the vertical stiffness is set to be higher than such shear stiffness.

The vertical stiffness of the first supporting area 7A is governed by elastic coefficients of the first strings 12a and the second strings 12b. That is, the vertical stiffness of the first supporting area 7A is increased by forming the first supporting area 7A using strings having a higher elastic coefficient. In addition, when the occupant 8 changes his/her posture, the first supporting area 7A is also subjected to the shearing load resulting from slippage between the back of the occupant 8 and the surface of the first supporting area 7A. The shear stiffness of the first supporting area 7A against such friction between the back of the occupant 8 and the surface of the first supporting area 7A is increased, in some embodiments, by increasing surface roughness of the first supporting area 7A or forming the first supporting area 7A using string material having a high friction coefficient. For example, one or more of animal and plant natural fiber, synthetic fiber, metal wire, carbon fiber and complex fiber of those material etc. is/are used as the first strings 12a and the second strings 12b in some embodiments.

Thus, the vertical stiffness and the shear stiffness of the first supporting area 7A can be adjusted by selecting desirable material and structure.

According to at least one embodiment, a sheet member 14 is used to form the second supporting area 7B. For example, one or more of natural material such as a leather sheet, synthetic resin material such as TPC-ET (thermoplastic polyester elastomer), and other kinds of artificial material such as fabric and non-woven fabric etc. is/are used to form the sheet member 14 in some embodiments. As depicted in FIG. 1, the sheet member 14 is formed into an X-shape, and disposed on a front surface of the first strings 12a and the second strings 12b to cover those strings. As described, the hub member 13 is disposed on the back side of the sheet member 14 and the first strings 12a extend radially between the hub member 13 and the frame 6 behind the sheet member 14.

Since the sheet member 14 is thus made of flexible material and stiffness itself is not so high, both upper ends and both side ends (or lower ends) of the sheet member 14 are fixed to the frame 6 to ensure desired vertical stiffness in the second supporting area 7B. For example, the vertical stiffness in the second supporting area 7B is increased, in some embodiments, higher than that in the first supporting area 7A by using material having high tensile strength or woven tightly to form the sheet member 14.

In addition, since the sheet member 14 is used to form the second supporting area 7B, a contact area between the spine of the occupant 8 and the second supporting area 7B is maintained to be wide in some embodiments. That is, the shoulder S of the occupant 8 is in line contact with each of the first strings 12a and the second strings 12b in the first supporting area 7A. By contrast, in the second supporting area 7B, a face contact (or surface contact) is realized between the spine of the occupant 8 and the sheet member 14. Further, when the sheet member 14 is flexibly depressed backwardly by the vertical load, the back of the occupant 8 leaning against the backrest 7 is held tightly, in some embodiments, by the sheet member 14 on both right and left sides. In the second supporting area 7B, therefore, resistance against a lateral motion of the occupant's back is increased so that the shear stiffness in the second supporting area 7B is increased higher than that in the first supporting area 7A.

The third supporting area 7C is also formed of the net member comprising the first strings 12a and the second strings 12b. In the third supporting area 7C, the first strings 12a are also drawn radially from the hub member 13 to a part of the frame 6 enclosing the third supporting area 7C, and a plurality of third strings (e.g., weft threads) 12c intersecting the first strings 12a. For example, the third strings 12c are drawn laterally through over-and-under the first strings 12a. Each end of each of the third strings 12c is also attached individually to the frame 6. In order to support the lumber spine R of the occupant 8, the third supporting area 7C is contoured along the lumber spine R of the occupant 8.

Specifically, a lower horizontal frame of the frame 6 is curved backwardly along the lumber spine R of the occupant 8, and lower ends of the first strings 12a are attached to the lower horizontal frame of the frame 6. As described, the third strings 12c are drawn laterally through over-and-under the first strings 12a. In order to contour the third supporting area 7C along the lumber spine R of the occupant 8, that is, to maintain a curved shape of the net member along the lower horizontal frame of the frame 6 curved backwardly, the third strings 12c are formed of string material having lower tensile strength than that of the first strings 12a.

When the third supporting area 7C is subjected to the vertical load of the lumber spine R of the occupant 8, the first strings 12a and the third strings 12c are pushed backwardly. That is, tensile load is applied backwardly to the third supporting area 7C from the lumber spine R of the occupant 8, and consequently the tension in each of the first strings 12a and the third strings 12c is individually increased. However, as described, the first strings 12a have sufficient tensile strength to achieve the desired vertical stiffness. In addition, the third strings 12c are also formed of material having tensile strength possible to increase the vertical stiffness in the third supporting area 7C higher than that in the first supporting area 7A to support the lumber spine R of the occupant 8. By contrast, when the third supporting area 7C is subjected to the shearing load of the lumber spine R of the occupant 8 in the direction along the surface thereof, at least one of the first strings 12a and the third strings 12c is stretched or compressed in the direction along the surface of the third supporting area 7C. That is, the shear stiffness in the third supporting area 7C is lower than that in the second supporting area 7B so that the lumber spine R of the occupant 8 is allowed to be twisted easier in the third supporting area 7C than in the second supporting area 7B.

Next, actions of the backrest 7 will be explained. As illustrated in FIG. 2, the back of the occupant 8 leans against the backrest 7. In this situation, the vertical load applied to the backrest 7 from the occupant 8 is supported mainly by the third supporting area 7C holding the lumber spine R of the occupant 8. As described, since the vertical stiffness of the net member formed of the first strings 12a and the third strings 12c is increased and the net member is contoured along the lumber spine R of the occupant 8 in the third supporting area 7C, the lumber spine R of the occupant 8 can be supported tightly and certainly in the third supporting area 7C.

The spine of the occupant 8 is supported within the second supporting 7B by the sheet member 14. As described, since both of the vertical stiffness and the shear stiffness are enhanced in the second supporting area 7B, the upper body of the occupant 8 can be supported steadily in the second supporting area 7B without being inclined laterally and backwardly.

Each of the shoulders S of the occupant 8 is individually held within, and/or supported by, the first supporting area 7A. As also described, since both of the vertical stiffness and the shear stiffness in the first supporting area 7A are lower than those in the second supporting area 7B, the shoulders S of the occupant 8 are allowed to move freely within the first supporting areas 7A. In the driver seat, since the occupant 8 holds his/her arms in front of him/her to grab the steering wheel, the vertical load applied to the first supporting area 7A from the shoulder S of the occupant 8 is rather small. Likewise, in a passenger seat, e.g., the front passenger seat, both arms of the occupant 8 are put on his/her knee in most situation and hence the vertical load applied to the first supporting area 7A from the shoulder S of the occupant 8 is also small. For this reason, the vertical stiffness can be reduced to ensure free movement of the shoulders S of the occupant 8 to stabilize occupant's head H.

Figure 4:
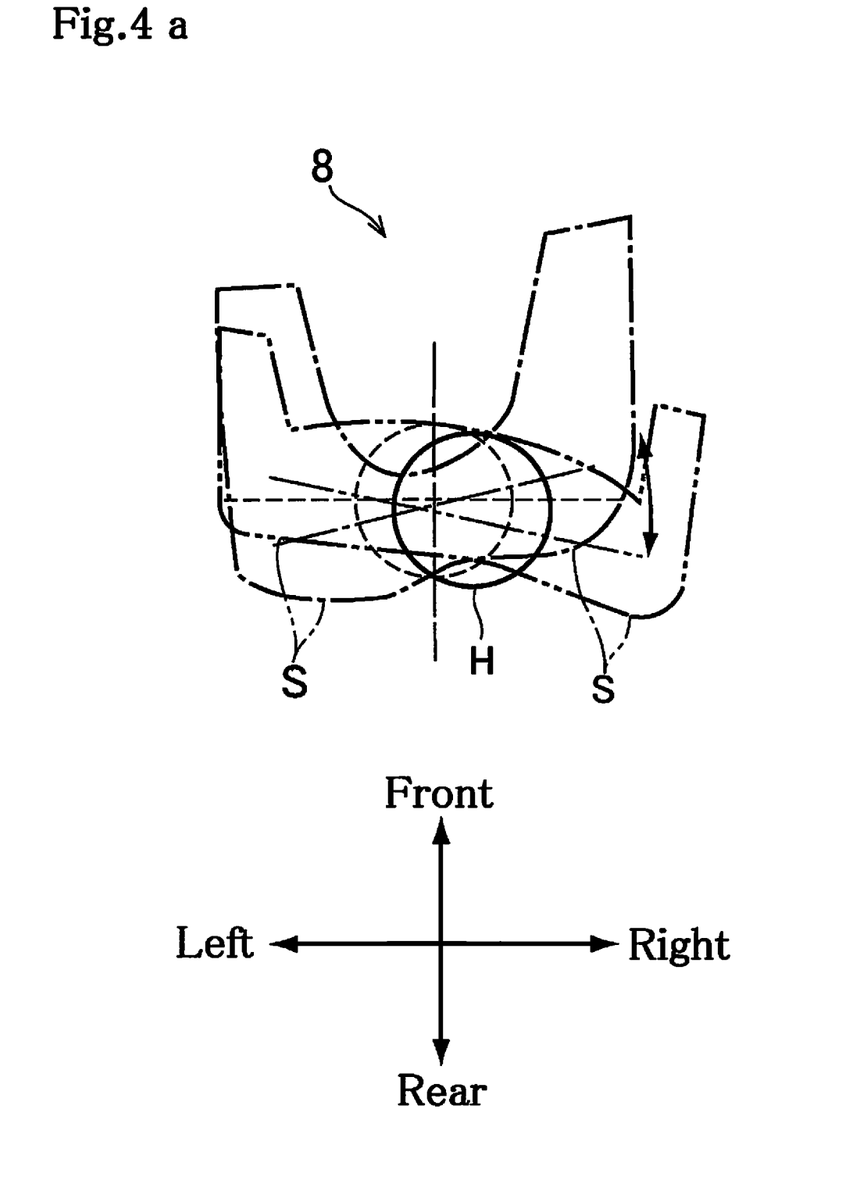
FIGS. 4*a* and 4*b* are schematic illustrations showing shoulder movements of the occupant from above.

For example, when the occupant 8 turns the steering wheel, one of his/her shoulders S is pulled forward and the spine of the driver is twisted as illustrated in FIGS. 4a and 4b, and consequently the other shoulder S is withdrawn backwardly. In this situation, since the vertical stiffness in the first supporting area 7A is lower than that in the second supporting area 7B, the resistance of the first supporting area 7A against such movement of the shoulder S is rather small so that the shoulder S that is withdrawn backwardly can be moved smoothly in the first supporting area 7A.

Figure 5:
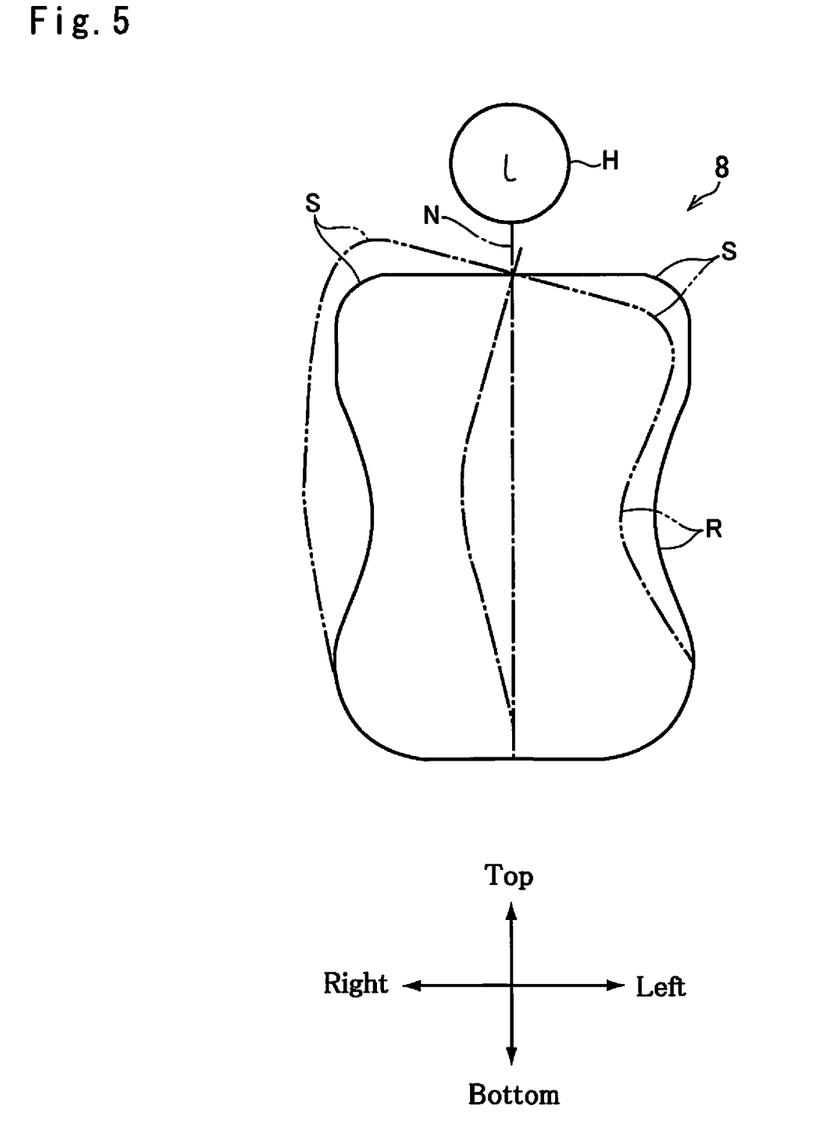
FIG. 5 is a schematic illustration showing a twisting motion of the upper body of the occupant caused by a swiveling motion of lumbosacral area.

When the occupant 8 is subjected to the lateral load during turning, the occupant 8 attempts to keep his/her body balance by twisting or swaying his/her lumber spine R to stabilize his/her head H. In this situation, each shoulder S of the occupant 8 is not only moved in the longitudinal direction but also rotated along the surface of the backrest 7 as illustrated in FIG. 5. When each shoulder S is thus rotated, friction acts between the shoulder S of the occupant 8 and the surface of the corresponding first supporting area 7A. However, since the shear stiffness in the first supporting area 7A is lower than that in the second supporting area 7B, each shoulder S including the shoulder blade is allowed to rotate smoothly within the corresponding first supporting area 7A. For this reason, the occupant 8 is allowed to keep natural attitude in the vehicle seat 1 to decrease fatigue.

In the third supporting area 7C, the vertical stiffness is high but the sear stiffness is low. That is, the lumber spine R of the occupant 8 is allowed to sway or twist smoothly when the occupant 8 is subjected to the lateral load during turning. For this reason, the occupant 8 is allowed to keep natural attitude in the vehicle seat 1 even during turning while stabilizing his/her head H. In addition, since the backrest 7 of the vehicle seat 1 is designed to allow the above-explained movement of the occupant 8 without using rotary joints or the like in some embodiments, the vehicle seat 1 can be manufactured or assembled at lower cost. Further, the vehicle seat 1 will not be broken easily.

Figure 6:
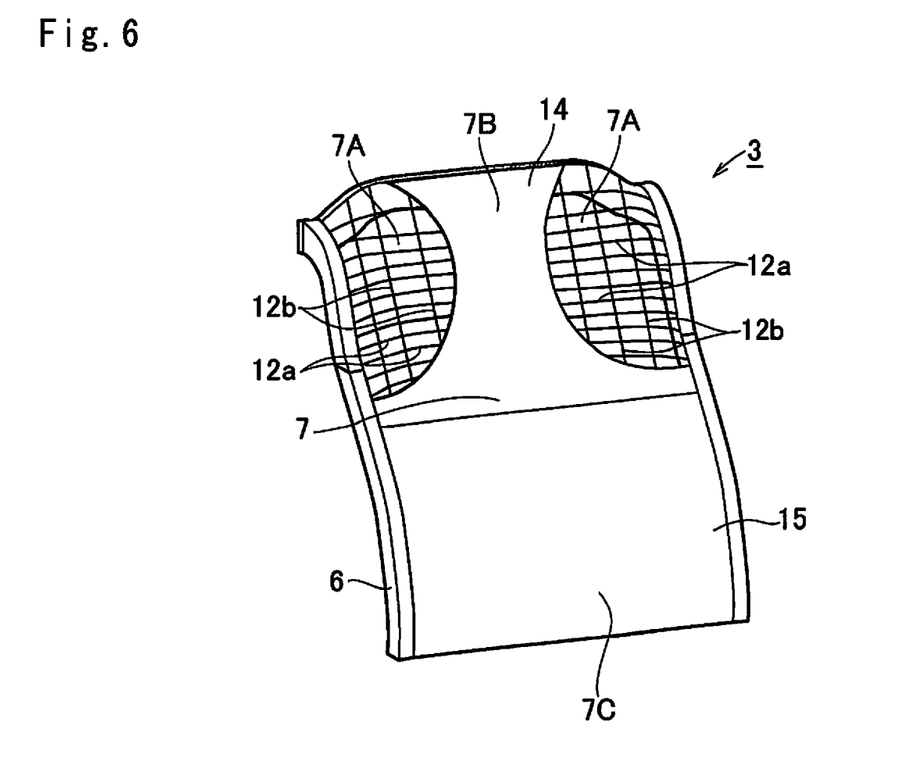
FIG. 6 is a perspective view showing the vehicle seat according to at least one embodiment of the present application.

Turning to FIG. 6, there is shown the vehicle seat 1 according to at least one embodiment of the present application. In the backrest 7, the first supporting area 7A is formed of the plurality of first strings 12a drawn longitudinally and the plurality of second strings 12b drawn vertically perpendicular to the first strings 12a. In this case, the first strings 12a are drawn, in some embodiments, between the frame 6 and an arcuate edge of the sheet member 14 in the second supporting area 7B in such a manner as to establish a desired tension. Likewise, the second strings 12b are drawn between the frame 6 and the arcuate edge of the sheet member 14 or within the arcuate edge of the sheet member 14.

The sheet member 14 is also used to form the second supporting area 7B. For example, if the headrest 5 is situated relatively in front of the sheet member 14 or sufficiently higher than the sheet member 14, the occupant 8 is allowed to move his/her neck N freely without forming the vacant area 11. However, although not especially illustrated in FIG. 6, the vacant area 11 is formed in the sheet member 14 according to some embodiments.

The third supporting area 7C is formed of a further sheet member 15. For example, the further sheet member 15 is formed of the same material as that of the sheet member 14. However, the vertical stiffness, the shear stiffness and the surface roughness of the further sheet member 15 is altered according to some embodiments by changing one or more of material, thickness and surface processing. According to some embodiments, the further sheet member 15 is made of sheet material having the shear stiffness lower than that of the sheet member 14.

Figure 7:
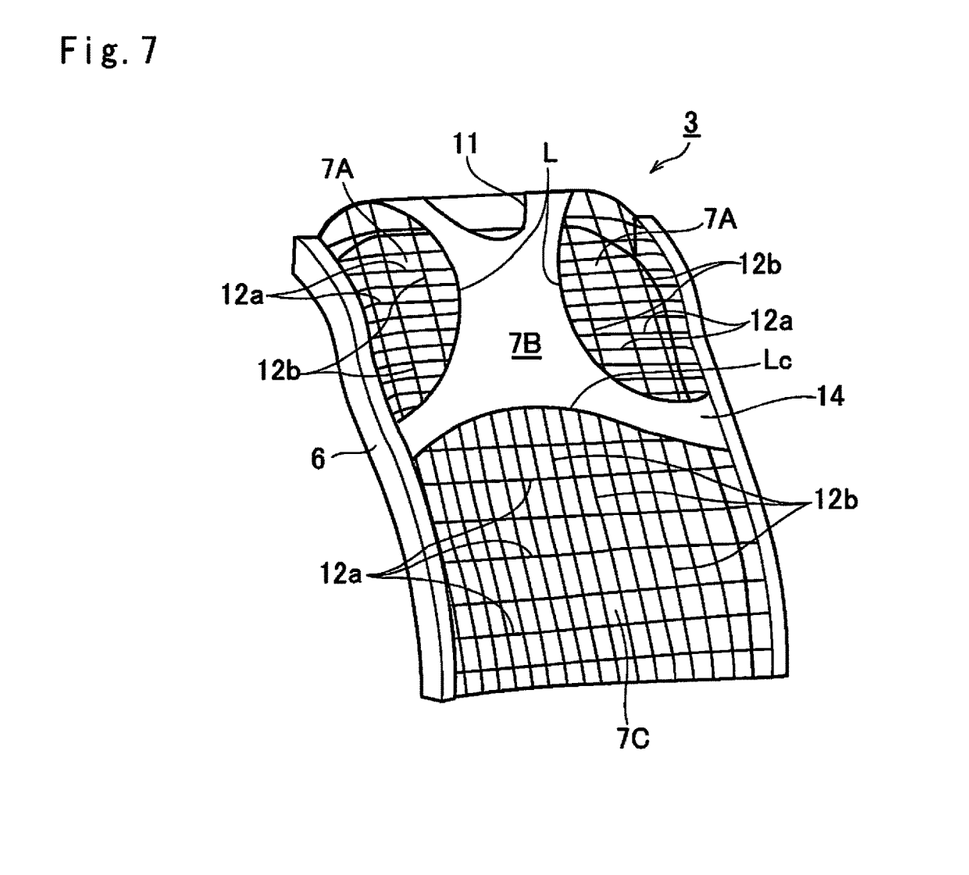
FIG. 7 is a perspective view showing the vehicle seat according to at least one embodiment of the present application.

Turning to FIG. 7, there is shown the vehicle seat 1 according to at least one embodiment of the present application. Like FIG. 6, the first supporting area 7A is also formed of the first strings 12a drawn longitudinally and the second strings 12b drawn vertically perpendicular to the first strings 12a. The sheet member 14 is also used to form the second supporting area 7B, but a lower edge Lc of the sheet member 14 is curved upwardly along latissimus dorsi muscle to increase the third supporting area 7C for holding the lumber spine R of the occupant 8 so as to ensure body movement within the third supporting area 7C.

The third supporting area 7C is also formed of the first strings 12a drawn longitudinally and the second strings 12b drawn vertically perpendicular to the first strings 12a. In this case, the second strings 12b are drawn between the lower edge Lc of the sheet member 14 and the frame 6 in such a manner as to establish a desired tension.

In some embodiments, a vehicle seat that can hold an occupant flexibly while allowing a longitudinal movement of an upper body is provided.

In the vehicle seat according to some embodiments of the present application, the shoulder of the occupant leaning on the backrest is supported within the first supporting area, and the spine area of the occupant is supported within the second supporting area. In the second supporting area, not only the support stiffness for the perpendicular load but also the support stiffness for the shearing load is higher than those in the first supporting area. In the vehicle seat, therefore, the upper body of the occupant is supported steadily within the second supporting area along the spine area thereby without being inclined laterally and backwardly. By contrast, in the first supporting area, the support stiffness for the perpendicular load and the support stiffness for the shearing load are lower than those in the second supporting area. For this reason, the occupant is allowed to move his/her shoulder freely within the first supporting area in both longitudinal direction and rotational direction. Thus, the occupant is allowed to keep natural attitude in the vehicle seat even when turning a steering wheel or during turning while stabilizing his/her head. That is, comfort of the vehicle seat can be improved while allowing the occupant to operate the vehicle.

As described, the vacant area is formed in some embodiments at an upper end of the second supporting area. Therefore, the occupant is allowed to move his/her neck freely within the vacant area to provide further improved comfort and to reduce fatigue in the neck.

As also described, the vehicle seat further comprises, in some embodiments, the third supporting area for supporting the lumber spine of the occupant in which the support stiffness for the shearing load is reduced. Therefore, the occupant is allowed to swing or twist his/her lumber spine freely within the third supporting area to provide further improved comfort.

Although some exemplary embodiments of the present application have been described above, it will be understood by those skilled in the art that the present application should not be limited to the described exemplary embodiments, and various changes and modifications can be made within the spirit and scope of the present application. For example, the third supporting area 7C is omitted according to some embodiments. Additionally or alternatively, the net member is formed not by interlacing the first strings 12a and the second strings 12b, but by an injection forming method using resin material to form the intersecting first strings 12a and second strings 12b, in some embodiments.

What is claimed is:

1. A vehicle seat, comprising:
a seatback including a seatback frame and a backrest attached to the seatback frame for supporting a back of an occupant sitting on the vehicle seat,
wherein the backrest includes
a first supporting area configured to receive a load of a shoulder of the occupant including a shoulder blade, and
a second supporting area configured to receive a load of a spine area of the occupant between the shoulders,
wherein vertical support stiffness in the first supporting area for a load perpendicular to the backrest is lower than that in the second supporting area, and
wherein shear support stiffness in the second supporting area for a load in a shearing direction is higher than that in the first supporting area.

2. The vehicle seat as claimed in claim 1,
wherein the first supporting area comprises a net member including strings intersecting each other, and
wherein the second supporting area comprises a sheet member.

3. The vehicle seat as claimed in claim 2,
wherein the net member further comprises a hub member disposed on a back face of the second supporting area corresponding to the spine area of the occupant,
wherein the intersecting strings include
a plurality of first strings drawn radially between the hub member and the frame, and
a plurality of second strings drawn to connect the first strings, and
wherein the plurality of first strings and the plurality of second strings are covered by the sheet member in the second supporting area.

4. The vehicle seat as claimed in claim 3,
wherein the backrest further includes
a third supporting area configured to support a lumber spine of the occupant sitting on the vehicle seat, the third supporting area arranged below the second supporting area, and
a plurality of third strings intersecting the plurality of first strings in the third supporting area.

5. The vehicle seat as claimed in claim 4,
wherein a material of the plurality of third strings has a lower tensile strength than that of the plurality of first strings.

6. The vehicle seat as claimed in claim 5,
wherein shear support stiffness in the third supporting area for a load in the shearing direction is lower than that in the second supporting area.

7. The vehicle seat as claimed in claim 1,
wherein a boundary between the first supporting area and the second supporting area is configured to curve along an outline of the shoulder blade.

8. The vehicle seat as claimed in claim 1, further comprising:
a vacant area formed in the second supporting area at a location adapted to be corresponding to a neck of the occupant.

9. The vehicle seat as claimed in claim 1,
wherein the backrest further includes a third supporting area configured to support a lumber spine of the occupant sitting on the vehicle seat, and
wherein shear support stiffness in the third supporting area for a load in the shearing direction is lower than that in the second supporting area.

10. The vehicle seat as claimed in claim 9,
wherein the third supporting area comprises a net member.

11. The vehicle seat as claimed in claim 10,
wherein the first supporting area comprises a further net member, and
wherein the second supporting area comprises a sheet member.

12. The vehicle seat as claimed in claim 11,
wherein the sheet member is X-shaped.

13. The vehicle seat as claimed in claim 9,
wherein the second supporting area comprises a sheet member, and
wherein the third supporting area comprises a further seat member having shear support stiffness for a load in the shearing direction lower than that of the sheet member.

14. The vehicle seat as claimed in claim 9,
wherein the second supporting area comprises a sheet member, and
wherein the third supporting area comprises a further seat member having the same material as the sheet member.

15. The vehicle seat as claimed in claim 9,
wherein the vertical support stiffness in the first supporting area for a load perpendicular to the backrest is lower than that in the third supporting area.

16. The vehicle seat as claimed in claim 1,
wherein the first supporting area comprises a net member including strings intersecting each other,
wherein the second supporting area comprises a sheet member, and
wherein the sheet member is X-shaped.

17. The vehicle seat as claimed in claim 1,
wherein the first supporting area comprises a net member including strings intersecting each other, and
wherein the second supporting area comprises a sheet member, and the sheet member does not cover the intersecting strings in the first supporting area.

18. The vehicle seat as claimed in claim 1,
wherein the second supporting area comprises a sheet member, and
wherein a lower edge of the sheet member is curved upwardly and adapted to extend along latissimus dorsi muscle of the occupant.

19. The vehicle seat as claimed in claim 1,
wherein the vertical support stiffness in the first supporting area for a load perpendicular to the backrest is higher than the shear support stiffness in the first supporting area for a load in the shearing direction.

20. The vehicle seat as claimed in claim 1,
wherein the backrest is free of rotary joints.

* * * * *